July 18, 1939.  T. F. W. MEYER  2,166,259
SHAFT BEARING
Filed Jan. 13, 1938
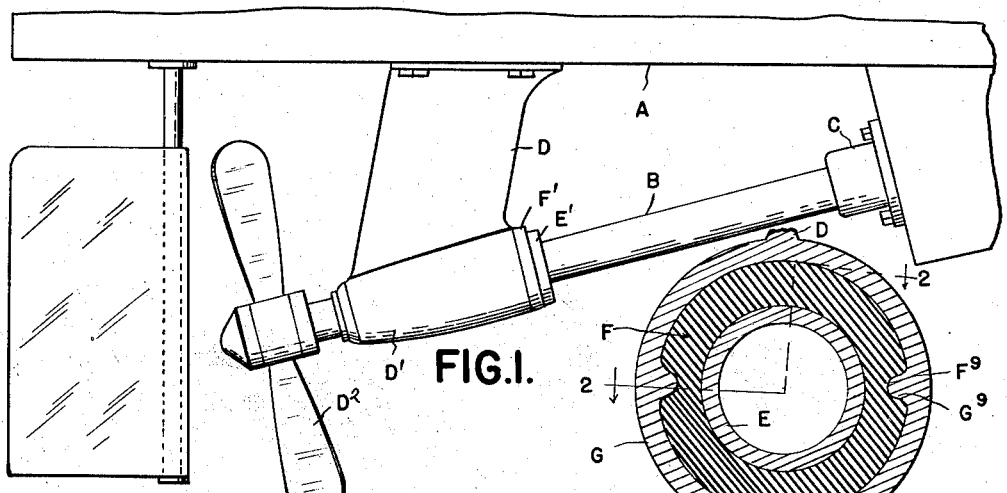
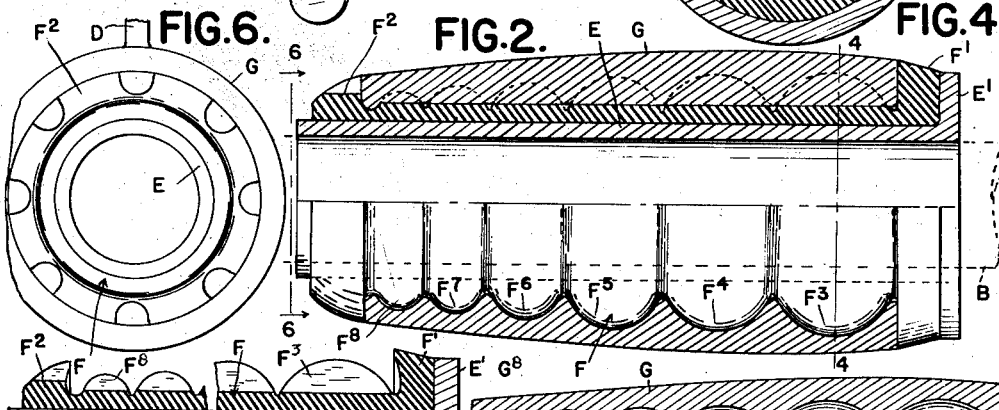
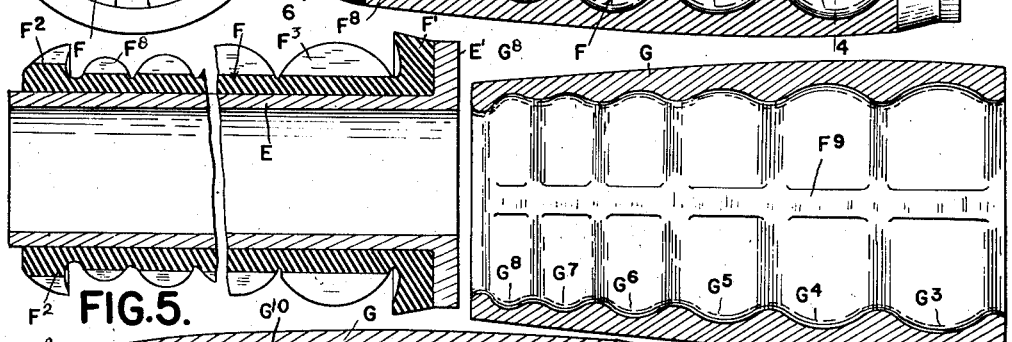
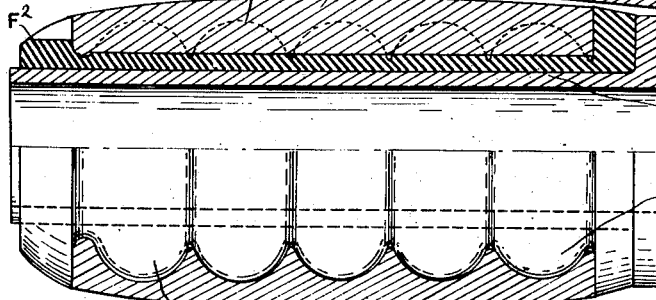
INVENTOR
THEODORE F.W. MEYER
ATTORNEYS Patented July 18, 1939

2,166,259

UNITED STATES PATENT OFFICE 2,166,259

SHAFT BEARING

Theodore F. W. Meyer, Birmingham, Mich., assignor to Federal Mogul Corporation, Detroit, Mich., a corporation of Michigan Application January 13, 1938, Serial No. 184,849

6 Claims. (Cl. 308—26)

This invention relates to a cushion bearing construction for a power shaft, and has for its object an improved organization of parts adapted both for use in the outside-the-hull strut bearing support, wherein the propeller shaft of a motor boat is rotatably supported, as well as in other bearing installations. It has for its particular object the compensation for the frequently encountered tight fit of such bearings, due either to slightly inaccurate positioning in the first place, or to such variances from proper alignment as may be caused by natural flexing of the hull, the whipping of the shaft, or the propeller wheel, or by some other relatively momentary distortion of the shaft from true alignment. And even at best, a bearing supported outside the boat structure tends to be objectionably noisy when the shaft is in rotation, and if there is misalignment of the parts a certain degree of binding as between the bearing housing about the shaft and its supporting strut housing is likely to take place, resulting in an impairment of the efficiency of the propulsion engine's operation, and excessive wear of the bushing.

In the drawing:

Figure 1 is a side elevational view, showing the positioning of my preferred shaft bearing structure relatively to the hull rudder etc. of the boat, the positioning therein of my improvement herein dealt with being shown in dotted lines.

Figure 2 is a central sectional elevational view of one form of my improved bearing construction with the traversing shaft being shown in dotted lines.

Figure 3 is a similar central sectional view of the external bearing portion only of my improved bearing assembly.

Figure 4 is a cross sectional elevational view taken along the line 4—4 of Figure 2 and looking in the direction of the arrows there shown.

Figure 5 is a sectional view in shortened lengthwise elevation of the internal bearing strut element and the associated sleeve or shaft-engaging piece, disassociated from the external shell piece which is similarly shown by itself in Figure 3.

Figure 6 is a cross-sectional elevational view of the assembled strut taken along the line 6—6 of Figure 2 and looking in the direction of the arrows there shown.

Figure 7 is a sectional elevational view, similar to Figure 2, but illustrative of a slightly modified form of my improved construction.

At A is shown a broken-away portion of a motor boat hull, with the propeller shaft B extending outwardly therefrom through bearings C.

The depending strut D is formed at its lower end to constitute another bearing support as D', wherein that portion of the shaft which is immediately adjacent the propeller wheel $D^2$ is located. As brought out particularly in Figures 2 and 5, immediately surrounding the shaft B is a sleeve E, of non-frictional material, provided at one end with a flange E'. Engaging immediately thereabout and non-rotatably vulcanized to the outer surface thereof is an externally corrugated sleeve F of rubber or similar flexible material, the right-hand terminal flange F' of which (as shown in Figure 2) engages the inner face of the shoulder or flange E'. It will be noted that the several constituent ribs or corrugations of this flexible bearing element, as $F^3$ to $F^8$ inclusive, are of diminishing size from right to left, as viewed in Figures 2 and 5. This flexible bearing element is adapted to be inserted lengthwise through the outer shell piece G, whose interior surface is provided with concave grooves, as $G^3$ to $G^8$ inclusive, which are preferably of not quite the diameter and curvature of their corresponding projections, $F^3$ to $F^8$ inclusive, of the companion bearing member F, though placed in corresponding axial position therewith; thus if the internal curvature of the concave groove $G^3$ of the outer element G be that struck from a $\frac{7}{16}$ inch radius, it is preferable that the corresponding convex groove $F^3$ of the member F have a radially struck curvature of $\frac{1}{2}$ inch, while the inner diameter of the groove $G^3$ is preferably about $\frac{1}{16}$ inch less than the outer diameter of the corresponding convex groove $F^3$; similar variations between the convex and concave curvatures of the respective diminishingly sized parts should be observed.

The positioning movement of the internal flexible element F axially lengthwise through the external element G is continued until the (at the left hand in Figures 2 and 5) terminal flange $F^2$ passes beyond the corresponding left hand end of the outer bearing element G, over whose end it then interlocks accordingly. Relative rotative movement of the parts G and F as thus assembled is prevented by the provision of the keyway groove $F^9$, within which, as brought out in Figure 4, a corresponding rib, as $G^9$, engages; and in turn the rotative movement of the assembled bearing structure relatively to the strut recess $D^2$ is prevented by the provision of a projection $G^2$ on the outer periphery of the bearing member G, which engages in a correspondingly cut-away portion of the bearing strut D'.

The form of bearing thus far described, and as illustrated in Figures 2 to 6 inclusive, is of particular utility in such bearing installations as would be employed within the supporting strut D, that is, where there projects therebeyond the propeller-wheel-supporting end of the shaft. In such an installation, if there is a tendency of the shaft to whip, because of the otherwise unsupported weight of the wheel at its extreme end, the degree of whip within the bearing structure itself would be greatest at the far end thereof from the wheel, that is, at the right-hand end as shown in Figures 1, 2, 3, and 5 of the drawing, and allowance and compensation therefor constitutes the reason for the preferred tapering to their maximum size at this end of the bearing of the several sections G' to G⁶ inclusive of the resilient member G.

In the case of such bearings locations or uses as shown at C in Figure 1, no such whipping condition need be taken into consideration, for in this case one end of the shaft extends forwardly within the boat structure to its support by its engine connection, while the opposite end is supported at D' as already indicated. Thus the modified form of my improved bearing construction which is indicated at C in Figure 1 and is illustrated in sectional detail in Figure 7, may be here employed. It employs the same sleeve, as E¹⁰, of non-frictional bearing material, but the corrugations of its resilient member F¹⁰ are all of uniform diametrical size, as are also the corresponding grooves on the inner surface of the outer shell G¹⁰; this for the reason that there is no greater degree of whip of the shaft to be encountered at one end of such a bearing than there is at the other end.

There is thus provided by either form of bearing described, a construction, which, as regards the strictly shaft-engaging part E may as usual be of any selected non-frictional bearing material. As regards the transmission of vibrations, due to the rotation of the shaft B, to the boat hull structure A, there is interposed between these parts the cushioning sleeve formed by the elements F and G or their modifications, which, because of the resilient character of the former tends to take up within its mass a large proportion of the vibrations and minor misalignments, thus cutting down the frictional drag upon the rotation of the shaft, as well as very largely reducing the noise incident to the propeller shaft's operation. A flexible bearing unit thus constituted is easy to install and replace, but in the absence of accident, its deterioration due to wear is relatively slight.

What I claim is:

1. A shaft bearing having a plurality of coaxially disposed members, the inner one of which is formed of non-frictional material and within which a power-transmitting shaft is adapted to engage, a closely fitting housing of resilient material positioned thereabout, the outer peripheral face of said housing being annularly ridged, and an enclosing shell for said housing of resilient material, having its interior surface provided with ridges of lesser diametrical size than those on the outer surface of the housing of resilient material, within which the correspondingly positioned ridges on the latter are compressively lodged, thereby enabling the absorption within the mass of the latter of the vibrations incident to the operative activity of the shaft.

2. A resilient bearing construction for a shaft, comprising a plurality of coaxially disposed members, the inner one a shaft-engaging sleeve of non-frictional material, the next a generally cylindrical member of resilient material having its peripheral surface annularly ridged, and an outer shell having its inner surface annularly contoured in approximate conformity with the external contourings of said resilient member though with the diameter of its several recited ridgings less than the corresponding ridgings on the outer surface of said resilient cylindrical member, the outer surface of said outer shell being adapted to be supportingly engaged by an external member, said outer shell and its supporting element being shielded from transmitted vibratory and torsional stresses resulting from the rotation of said shaft by the interposed resilient cylindrical member.

3. A resilient bearing, comprising a plurality of telescopically disposed parts, the inner one of said parts being adapted to non-frictionally engage about a rotatable shaft and the outer one of said parts being adapted to be positioned in an external supporting element, the central one of said recited parts being of resilient material and having its interior surface secured to the adjacent outer surface of said shaft-engaging part and being provided with corresponding ridgings of greater individual diameter than those on the adjacent inner surface of the outer one of said parts whereby it is held against relative movement with respect thereto, and being adapted to absorb within its mass the vibratory impulses transmitted to it through the shaft-engaging part which result from the operative activity of the shaft.

4. A bearing structure composed of a plurality of telescopically disposed parts, one of which is formed of resilient material, and another of which is formed of relatively rigid material adapted to be rested within a suitably recessed portion of an external supporting member, and the respective and approximately complementary outer and inner surfaces of said recited parts being annularly and complementarily ridged and held from rotation with respect to one another, and an interiorly disposed bearing sleeve of non-frictional material similarly held from possible rotative movement with respect to said resilient member and which is adapted to engage about a power shaft.

5. A shaft bearing, having, in combination with a shaft-engaging inner shell of non-frictional material, and an externally supportable shell having annular corrugations and longitudinal rib contourings on its inner surface, a generally cylindrical body of resilient material interposed between said parts and provided on its outer periphery with complementarily positioned though individually larger external contourings to the described corrugations and rib elements on the inner surface of said externally supportable shell, and having its inner surface fixedly attached to the outer surface of said shaft-engaging inner shell, whereby vibrations and torsional stresses due to the rotation of the shaft are largely absorbed within said body of resilient material.

6. In a bearing, in combination with a shaft-engaging member of non-frictional material, a coaxially positioned outer shell having its interior surface annularly ridged and adapted to be supported within a suitably contoured portion of an external supporting member, and an interposed member of resilient material having its inner surface fixedly attached to the external surface of said shaft-engaging member, the external surface of said interposed resilient member being provided with ridgings generally corresponding in their location with those on the interior surface of said outer shell, said ridgings being individually of larger diameter than the complementary ridgings on the interior surface of the outer shell, within which latter the ridgings on the resilient member are compressively lodged, thereby enabling the vibratory strains incident to the operative activity of the shaft to be absorbed within the mass of said resilient member.

THEODORE F. W. MEYER.